Aug. 16, 1938.   R. CHILTON   2,127,463
REDUCTION GEAR
Filed March 26, 1937   3 Sheets-Sheet 2
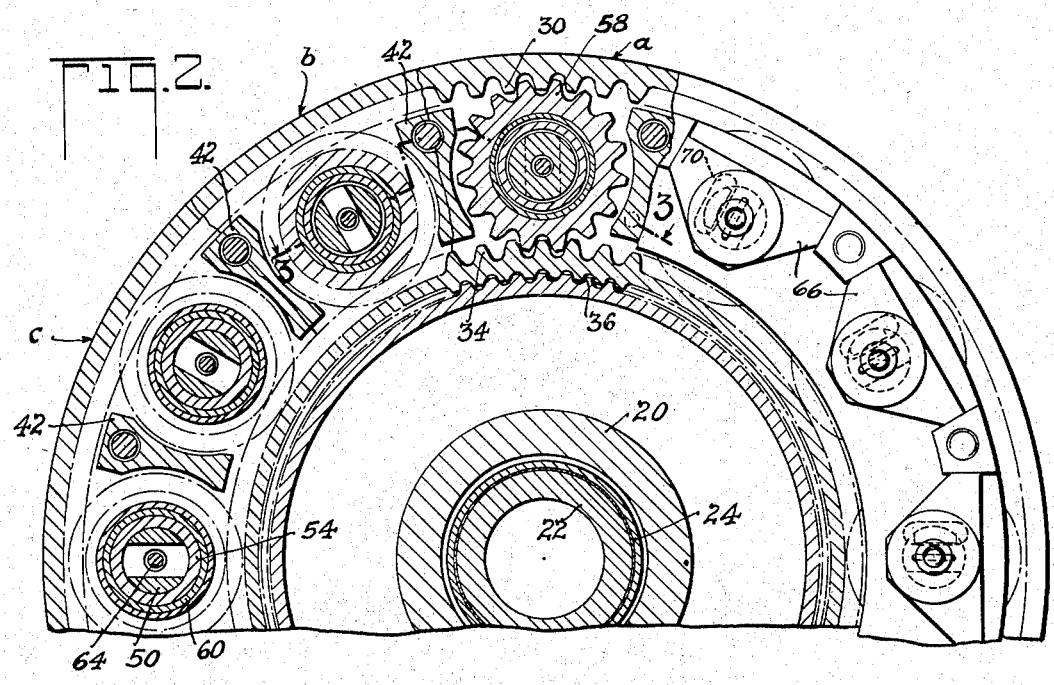
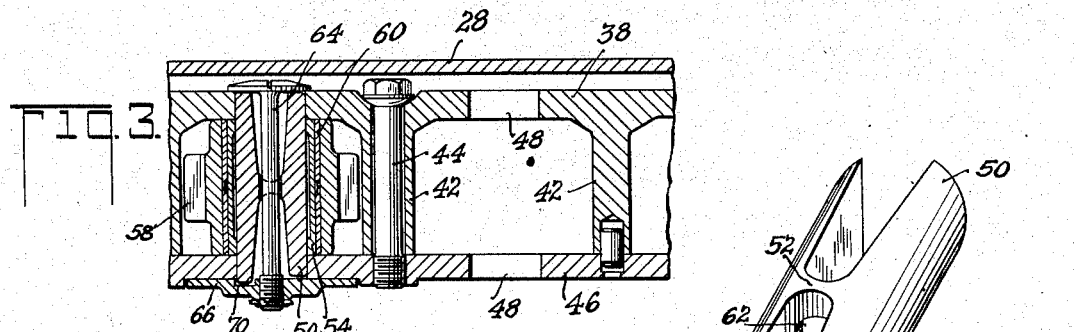
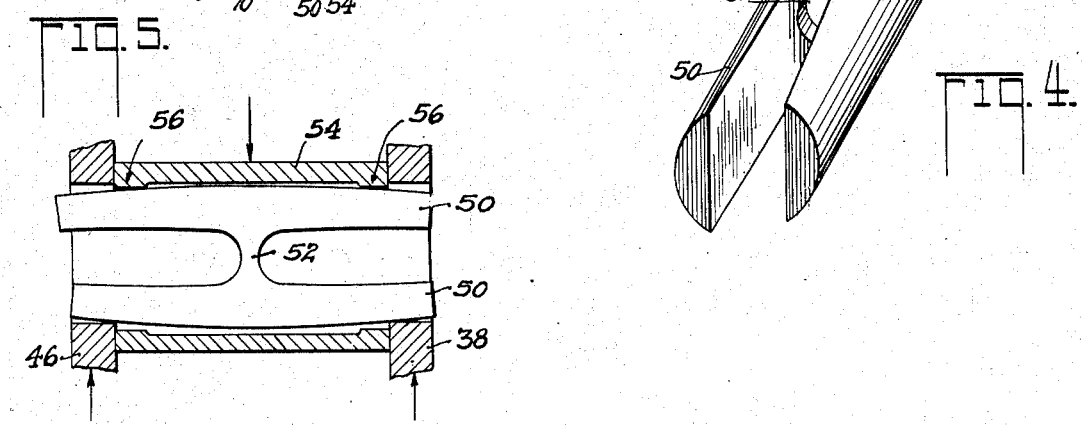
INVENTOR.
ROLAND CHILTON
BY
ATTORNEY.

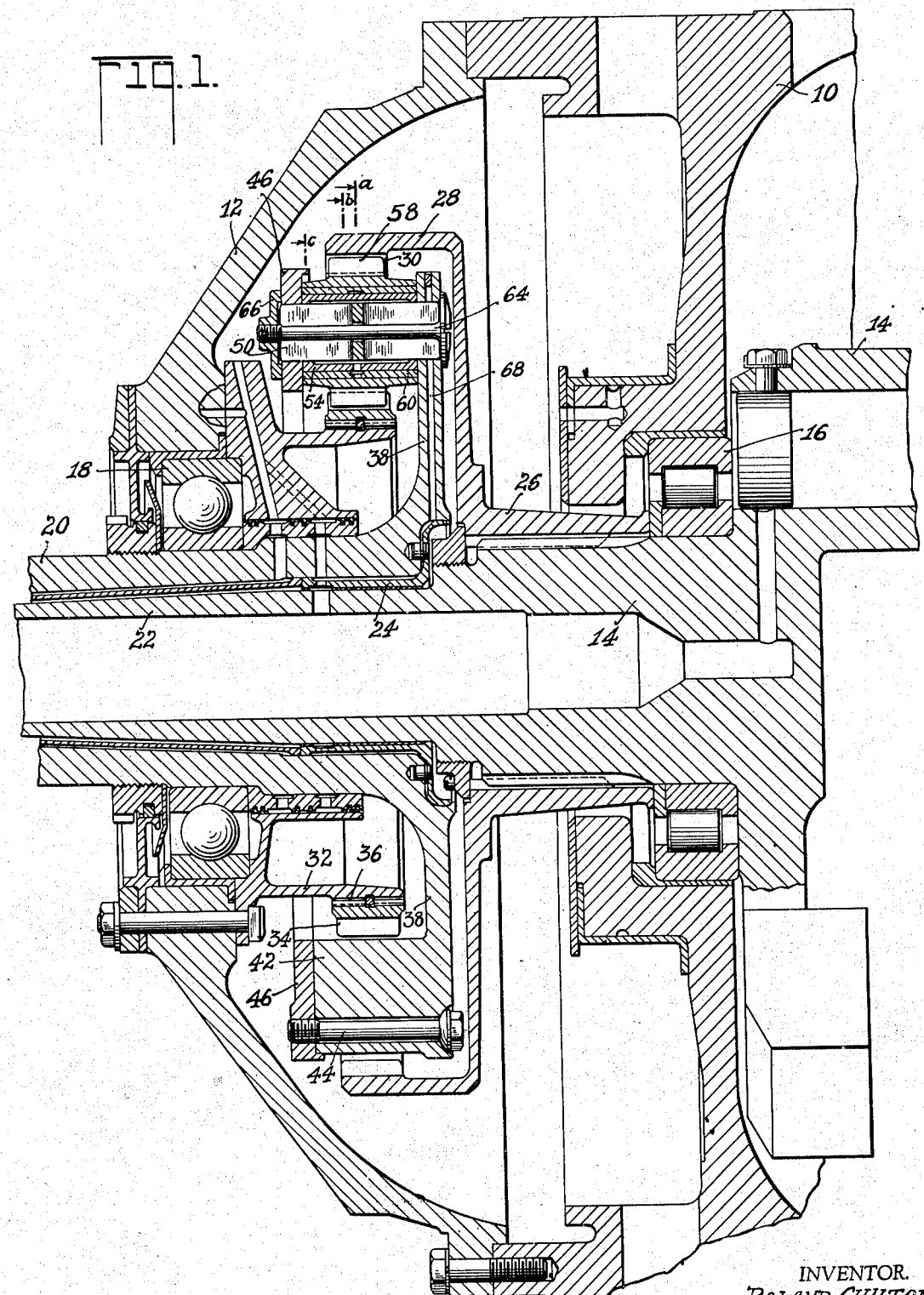

Aug. 16, 1938.  R. CHILTON  2,127,463
REDUCTION GEAR
Filed March 26, 1937   3 Sheets-Sheet 3
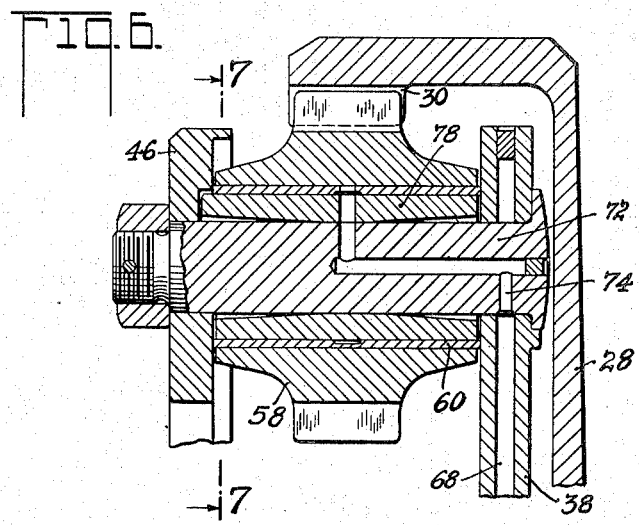
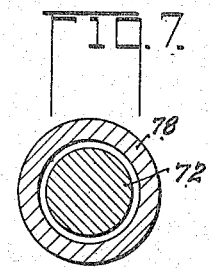
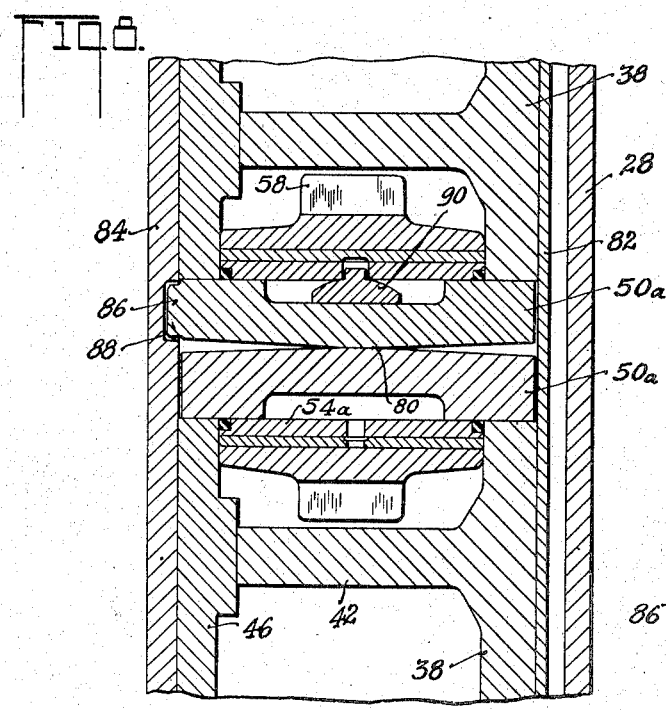
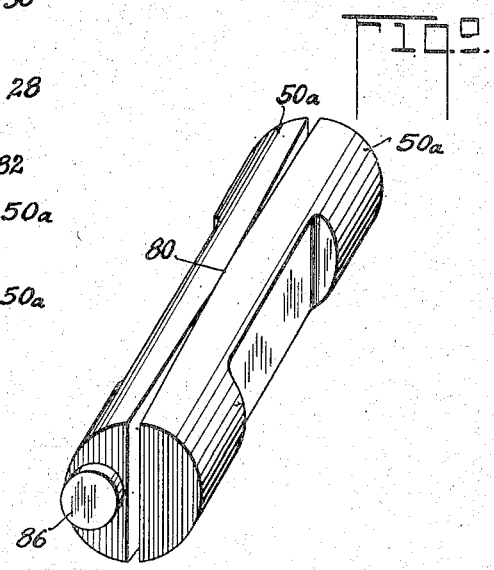
INVENTOR.
ROLAND CHILTON
BY
ATTORNEY.

Patented Aug. 16, 1938

2,127,463

UNITED STATES PATENT OFFICE 2,127,463

REDUCTION GEAR

Roland Chilton, Ridgewood, N. J., assignor, by mesne assignments, to Wright Aeronautical Corporation, Paterson, N. J., a corporation of New York Application March 26, 1937, Serial No. 133,153

9 Claims. (Cl. 74—305)

This invention relates to planetary type reduction gears, the specific showing of the drawings illustrating a gear of 5:3 ratio.

In certain respects, the invention comprises improvements on my Patent No. 1,950,971 issued March 13, 1934, especially applicable to gears approaching 2:1 ratio wherein planet pinion diameters become relatively small. This has the great advantage of permitting a very large number of pinions to be used thereby greatly increasing the capacity of the gear with very little increase in weight.

As set forth in the patent referred to, the manufacturing technique in gears of this character must be controlled to reduce the spacing errors of the pinions in the cage to a minimum. By the previous invention the structure as a whole is endowed with some slight inherent elasticity allowing deflections which tend to reduce the uneven load distribution between the pinions and gears resulting from twisting of the pinions under load.

A prime object of the present invention is to provide a method of pinion support providing substantially greater elastic yield or deflection at the individual pinions than is afforded in the usual constructions. An associated object is to provide elastic or yielding supports for the individual pinions which shall be sufficiently compact for application to pinions of relatively small diameter whereby ratios approaching 2 to 1 may be achieved in a simple spur type planetary gear.

While relative flexibility of the individual pinion supports circumferentially is very desirable to compensate for manufacturing variations from perfect pinion spacing, there is present an angular form of deflection which should also be compensated. In planetary gears the planet pinion support assembly or cage is necessarily driven from one side only, inducing an angular yield in the planet cage structure which produces misalignment of the teeth which tend to become heavily loaded at that end of the cage structure at which the power is applied or taken off.

Accordingly, a further object of the invention is to provide improved means to compensate for these angular deflections and so to provide an angularly floated pinion whereby the resultant of the loads will be applied centrally of the teeth in spite of the inevitable deflections in the pinion supporting structure.

Other objects and advantages will be pointed out in, or will be obvious from the following description, with reference to the drawings in which:

Fig. 1 is a fragmentary axial section thru the front portion of a radial aircraft engine incorporating the invention;

Fig. 2 is an end view in which segments (a), (b) and (c) are in section on the correspondingly marked lines of Fig. 1 and the right hand segment is in partial outside view;

Fig. 3 is a fragmentary section on the line 3—3 of Fig. 2;

Fig. 4 is a perspective view of the flexible pinion supporting pin shown in Fig. 3;

Fig. 5 is a diagram showing the compensating action of the pin much exaggerated;

Fig. 6 is a fragmentary section illustrating an alternative and simplified pin structure;

Fig. 7 is a fragmentary section on the line 7—7 of Fig. 6;

Fig. 8 is a fragmentary axial section illustrating slight structural modifications of the type illustrated in Figs. 1 to 5;

Fig. 9 is a perspective view of the pin structure of Fig. 8.

Referring first to Fig. 1, 10 designates a conventional engine crankcase having a gear casing or nose 12, the usual crankshaft 14, and front main bearing 16. The nose is provided with a thrust bearing 18, locating a propeller shaft 20, the latter being supported on a crankshaft extension 22 on suitable bearings, one of which is indicated 24. Rigidly splined to the crankshaft 14 is a hub 26 of a bell gear 28 having internal teeth 30. Bolted to the nose 12 is a fixed member 32 carrying a sun gear 34 through splines 36. All the parts so far described may be of conventional form and therefore need no further explanation.

The planet cage structure of the invention consists of a back plate or disc 38 integral with the propeller shaft 20 and formed with circumferentially spaced extensions or stumps 42 indicated also in cross section in Fig. 2. These stumps extend radially from the teeth of the bell gear 30 to the teeth of the sun gear 34. Secured to the outer or left hand ends of these integral stumps by bolts 44, is a cover ring 46, the stumps 42 just described forming pockets to accommodate the pinions as will be clear from Fig. 3.

The back plate 38, and cover ring 46 are bored as indicated at 48 between stumps 42, the spacing and alignment of the holes being held to the closest commercially practicable limits. Each set of these holes supports a flexible and self-aligning structure, illustrated in one form by the split pin shown in perspective view of Fig. 4, the pin comprising two halves 50 united at their center portion only by a narrow bridge 52. The pin is embraced by a rigid journal sleeve 54, which bears on the pin 50 at the ends only of the sleeve 54, as indicated at 56 (Fig. 5). The sleeve 54 comprises the journal for a planet pinion 58, a floating bearing bushing 60 being preferably interposed. The load application to the pins 50 and the resulting deflections are illustrated in Fig. 5 from which it will be seen that the two halves 50 of pin comprise beams having individual bending flexibility which is cumulative to permit compensating movement of any pinion which, due to spacing errors of the holes 48, would otherwise be subject to excessive load. Referring again to Figs. 4 and 5, it will be seen that the bridge 52 carries its load in compression wherefore it may be made relatively thin as indicated, thus affording latitude for angular deflection between the pin halves 50, thus to compensate for any angular deflections in the cage such as might result in slight flexing of the stumps 42, which are driven at one end from the integral plate 38, and loaded at their extended ends from the plate 46, the latter supporting the outboard ends of the pin elements 50. These pins may be provided with clearance holes 62 to accommodate thru bolts 64 screwed into plates 66, the plates each having a locating recess 70 into which one end of the pin element 50 projects. The function of the details just described is merely to locate the pin to prevent its displacement in the cage members 38 and 46 and to form an oil closure whereby pressure oil fed thru radial holes 68 (Fig. 1) is forced to the bushing 60.

Figures 6 and 7 show an alternative simplified construction affording less circumferential compensating flexibility than the bifurcated pin structure previously described but having equal degree of compensation for angular distortions. In this case a simple cylindrical pin 72 supports a rockable journal sleeve 78 which is bell-mouthed so as to contact the pin near the center only. The pin is provided with oil holes 74 to conduct oil to the floating bushing 60, as shown. In this embodiment, the sleeve 78, with its pinion 58, may rock relative to the pin 72 and supporting structure.

Figures 8 and 9 show detail modifications of the embodiment first described wherein, the halves of the pin, 50a, are made separate and have their adjacent faces rockered as shown to abut only towards the center 80 of the length of the pins. In this case the pins are located and oil-sealed by cover plates 82, 84 suitably secured to the cage members 38, 46, an eccentric projection 86 on the one pin half engaging a suitable locating hole 88 formed in one of the covers. A detent or keeper 90 is provided to prevent rotation of the rigid sleeve 54a on the pin elements 50a. This keeper engages a flat formed on the pin element the size of which flat is proportioned to give the flexibility characteristics desired. In this case, the sleeve and one element 50a may rock at the point 80 on the other pin half, the halves being deflectable as beams to give circumferential flexibility to the pinion 58.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a planet pinion carrier having side walls defining pinion pockets and provided with circumferentially spaced bores, pinion supporting pins engaging said bores, each pin comprising two flexible elements longitudinally separated from each other except near the center of their length, a sleeve supported by said pin and a planet pinion journalled on said sleeve.

2. In a planetary gear, a planet cage comprising axially spaced side plates having alined bores, a pin assembly engaging said bores and bridging the space between said plates, said assembly including halves relatively angularly movable and being flexible for circumferential deformation, and a pinion journal sleeve carried by said assembly bearing predominantly on one said half for rocking and circumferential movement therewith relative to the cage.

3. In a planetary gear, a planet cage including axially spaced end plates having alined bores, a pin engaging said bores and bridging the space between said plates, a sleeve embracing said pin, said sleeve and pin being relatively tapered from wide clearance at the ends to contact at the center, to permit of relative rocking between the sleeve and pin, and a planet pinion journalled on the sleeve.

4. In a planetary gear, a planet cage including axially spaced end plates having alined bores, a pin engaging said bores and bridging the space between said plates, a sleeve embracing said pin, said sleeve and pin being relatively tapered from wide clearance at the ends to contact at the center, to permit of relative rocking between the sleeve and pin, a planet pinion journalled on the sleeve and means restraining said pin and sleeve from rotation relative to the plates.

5. In a planetary reduction gear having a planet-carrying cage including a bore, a planet support pin engaging within said bore, said pin being slotted in a radial plane to permit of circumferential but not of radial yielding of the pin, a bearing sleeve carried by said pin, and a planet pinion journaled on said sleeve.

6. In a planetary reduction gear having a planet-carrying cage including a bore, a planet support pin engaging within said bore, said pin being slotted in a radial plane to permit of circumferential but not of radial yielding of the pin, a bearing sleeve carried by said pin, a planet pinion journaled on said sleeve, and means for locating said support pin against turning in said bore.

7. In a planetary reduction gear having a planet cage including end plates having aligned bores, a pin unit having bifurcated ends disposed circumferentially of the cage with respect to each other and engaged within said bores, said pins bridging the space between said plates, a bearing sleeve embracing and bearing at its ends on and toward the ends of said pin unit, and a planet pinion journaled on said sleeve.

8. In a planetary reduction gear having a planet cage including end plates, a spring element bridging the space between said plates so formed and disposed as to have resilience circumferentially of the cage but to be substantially rigid radially of the cage, a bearing supported on said spring element for circumferential yield therewith and for angular deviation from a line parallel to the cage axis, and a pinion journaled on said bearing.

9. In a planetary reduction gear having a planet carrier, pins extending therefrom having resilience circumferentially of the carrier and having substantial stiffness radially thereof, bearing sleeves rockably engaging said pins for circumferential yield therewith, and planet pinions journaled on said sleeves.

ROLAND CHILTON.